March 27, 1928.                                                    1,664,177
A. J. KERCHER ET AL
ELECTRIC HEATER
Filed Aug. 26, 1925          3 Sheets-Sheet 2
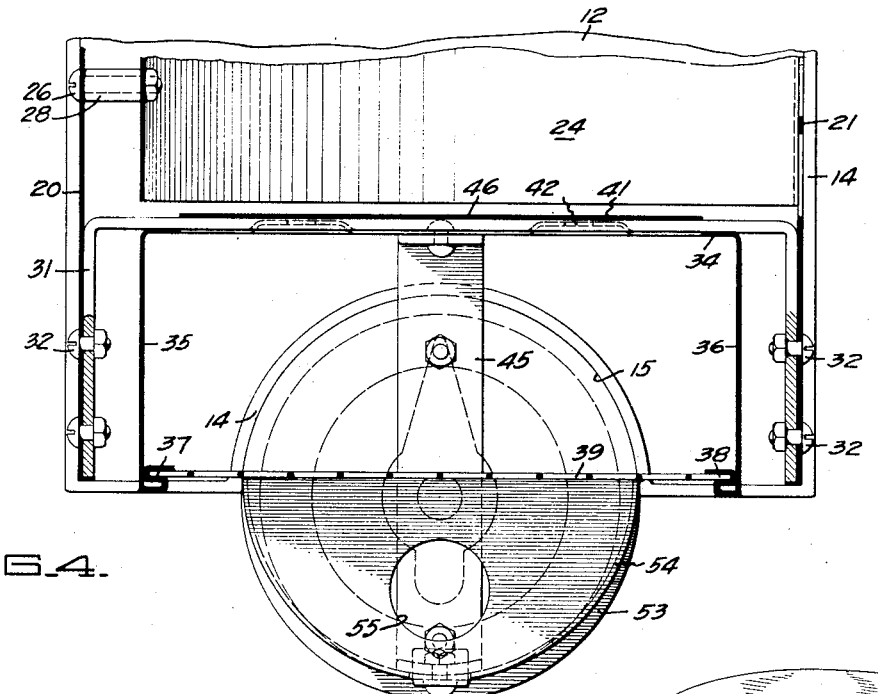
FIG. 4.
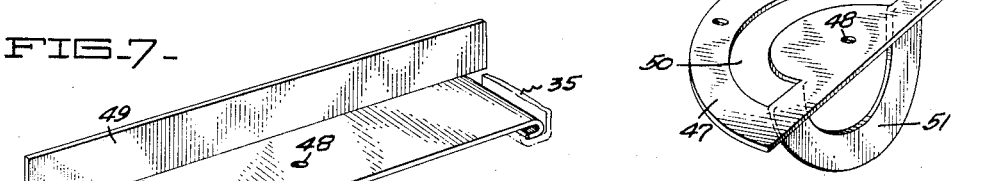
FIG. 7.                                              FIG. 6.
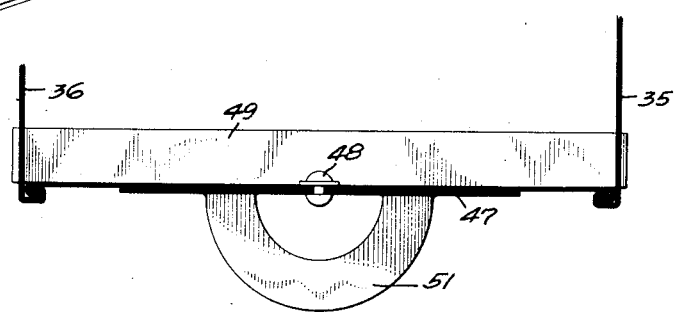
FIG. 5.
INVENTORS
William Wesley Hicks
BY Arthur J. Kercher
White & Prost
their ATTORNEYS March 27, 1928.
A. J. KERCHER ET AL
ELECTRIC HEATER
Filed Aug. 26, 1925
1,664,177
3 Sheets-Sheet 3
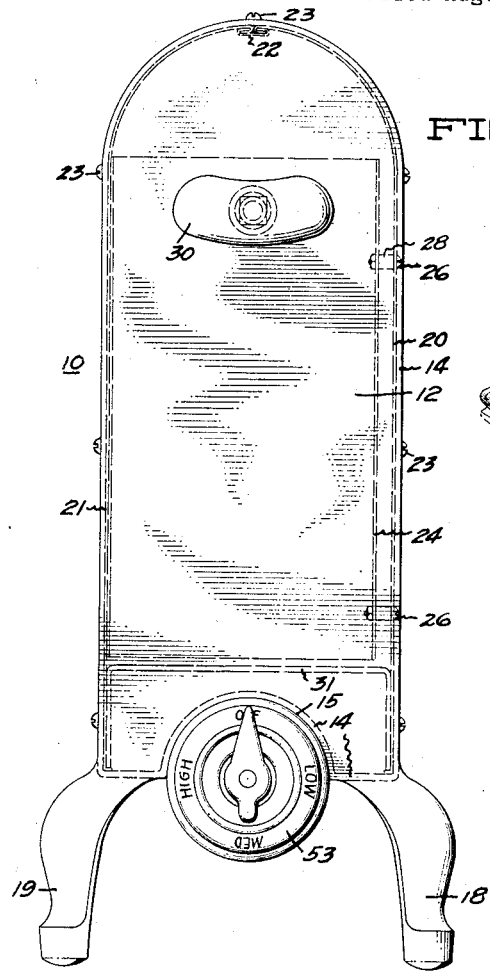
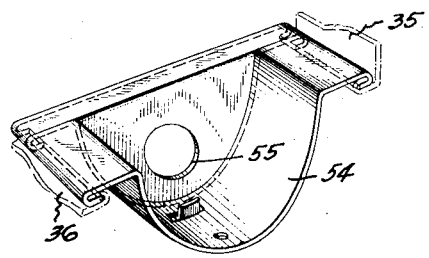
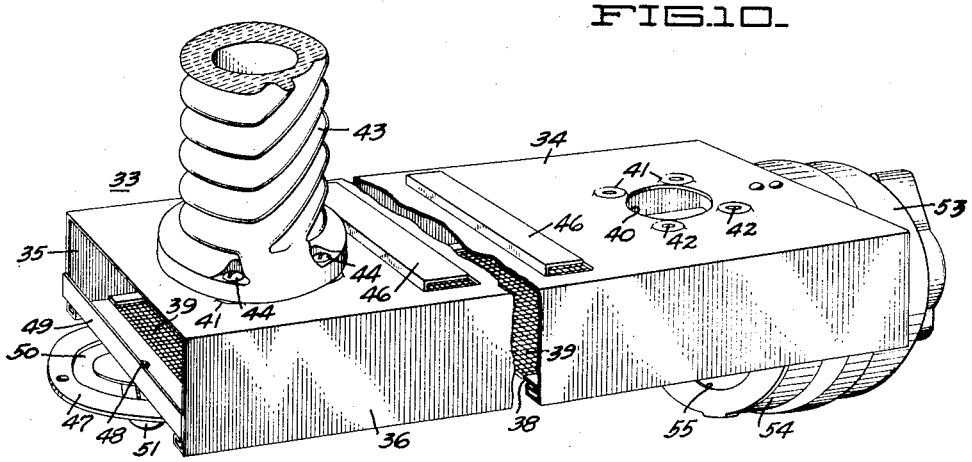
INVENTORS
William Wesley Hicks
BY Arthur J. Kercher
White & Prost
their ATTORNEYS Patented Mar. 27, 1928.

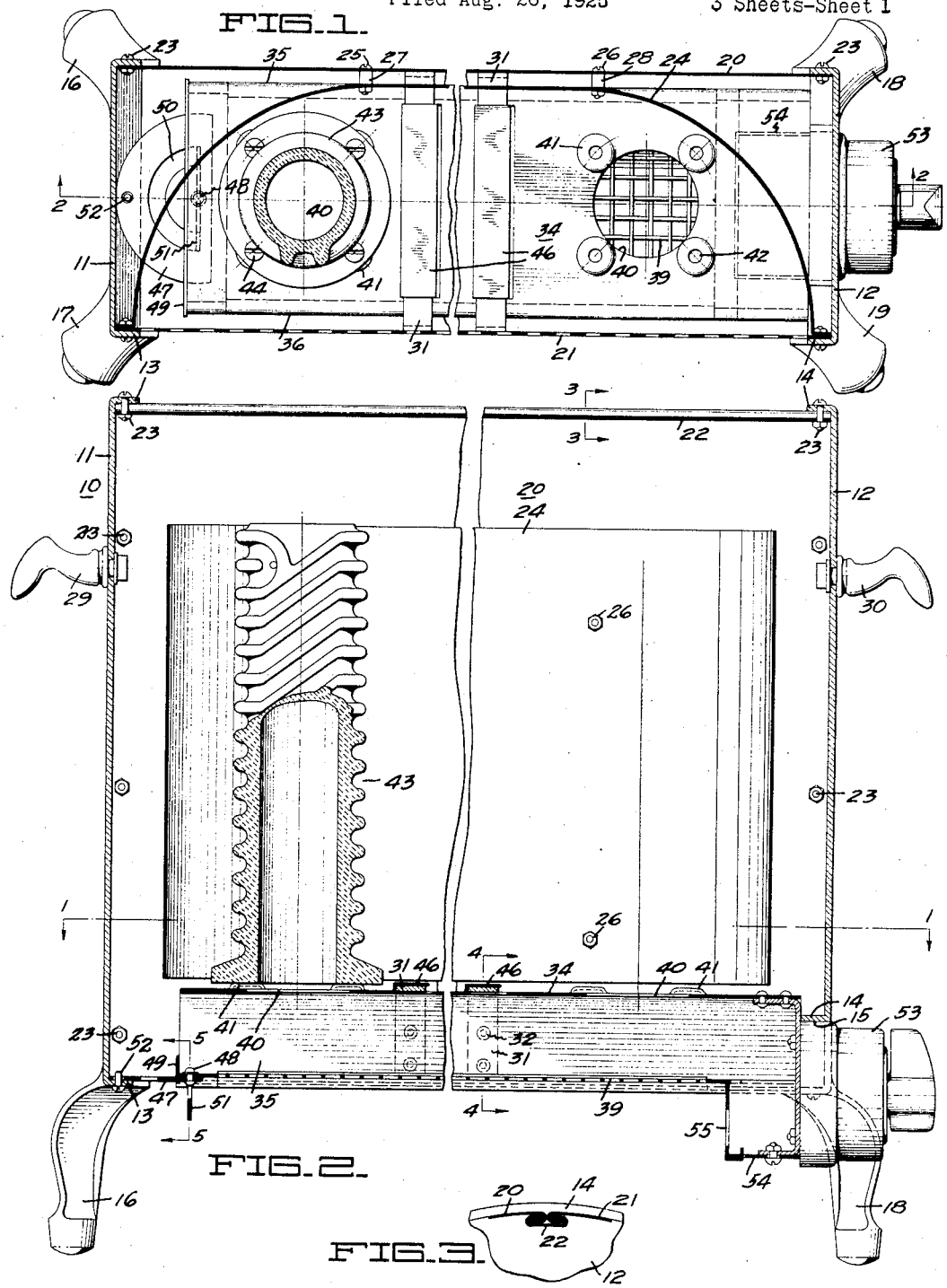

1,664,177

UNITED STATES PATENT OFFICE.

ARTHUR J. KERCHER, OF BERKELEY, AND WILLIAM WESLEY HICKS, OF SAN FRANCISCO, CALIFORNIA.

ELECTRIC HEATER.

Application filed August 26, 1925. Serial No. 52,514.

This invention relates to electric heaters and has for its object the provision of a simple, compact and efficient device of this character.

More particularly, our invention relates to portable electric heaters which may be readily assembled and which is so arranged that worn or defective parts may be readily replaced or corrected.

Heretofore, in units of this character the housing or casing, by which term we include the supports, the protecting grill, heat distributor and walls forming air passages, and the electrical unit, which includes the electrical heating element, electrical connections and switch control, were all assembled as individual parts and secured together to form a complete unit. This made it difficult to assemble the unit and required the removal of numerous parts when it was necessary to replace burned out heating elements or to correct defects in the electrical connections. To overcome these difficulties we have provided a heater comprising two assembled units. One of these units includes the casing or housing for the protecting grill or screen, baffle wall and air passages, and the other unit comprises the electrical heating elements, control switch and connections. Each of the units namely the casing and the electrical unit, are first assembled and the two units are so arranged that the electrical unit may be inserted in operative position in the housing unit or casing and secured therein by a single latch. By this arrangement the unit comprising the electrical elements may be readily removed whenever desired.

The invention possesses other advantageous features, some of which with the foregoing will be set forth at length in the following description, wherein we shall outline in full the form of the invention which we have selected for illustration in the drawings accompanying and forming part of the present specification. In said drawings we have shown one form of device embodying our invention, but it is to be understood that we do not limit ourselves to such form, since the invention, as set forth in the claims, may be embodied in a plurality of other forms.

Referring to the drawings:

Figure 1 is a horizontal section taken on the line 1—1 of Fig. 2 which illustrates one form of electric heater embodying our invention.

Figure 2 is a vertical section taken on the line 2—2 of Figure 1.

Figure 3 is an enlarged detail view taken on the line 3—3 of Fig. 2.

Figure 4 is an enlarged detail view taken on the line 4—4 of Fig. 2.

Figure 5 is an enlarged detail view taken on the line 5—5 of Fig. 2.

Figure 6 is an enlarged perspective view illustrating one form of latch employed to secure the electric heating element unit in the casing unit.

Figure 7 is an enlarged perspective view illustrating the element which supports the latching element.

Figure 8 is an end view of Figure 2 as seen from the right.

Figure 9 is an enlarged perspective view illustrating a part of the casing which surrounds the switch mechanism and Figure 10 is an enlarged perspective view of the electrical heating element unit, with certain of the parts omitted.

In the drawings we have shown one form of housing or casing designated as a whole by the numeral 10, embodying our invention, however, it is to be understood that such housing may assume various forms. In the form shown, the housing 10 comprises two vertical end walls 11 and 12 which are preferably rounded at their upper ends. The edges of the walls 11 and 12 are bent inwardly at right angles to form surrounding flanges 13 and 14 on the same respectively as best shown in Figs. 1 and 2. The lower end of the wall 11 is preferably rectangular and the lower end of the wall 12 is provided with a central circular cut-out portion 15 for a purpose hereinafter described. The walls 11 and 12 are also provided with feet 16, 17, and 18, 19, respectively which are preferably formed integrally therewith. The rear wall of the housing 10 is formed with a plate 20 which extends from the lower edges of the end walls 11 and 12 upwardly over the rounded portions thereof and to a middle point thereon. The front wall of the housing is formed with a grill element 21 or screen which extends from the lower edges of the end walls 11 and 12 upwardly to the upper edge of the rear wall 20. The upper edges of the walls 20 and 21 are folded back and are clamped together by a flattened C-shaped strip 22 as shown in Fig. 3. The rear wall 20 and the front wall 21 are secured to the flanges 13 and 14 in any suitable manner such as by bolts 23. A vertical heat distributor 24 is positioned within the unit so formed and preferably comprises a sheet of copper or similar metal which gives off heat to the air currents passing over the front and rear surfaces thereof. When desired, the front surface of the distributor may be polished, so that it serves to reflect a portion of the heat. The distributor 24 is preferably curved horizontally as shown in Fig. 1 and is secured at its vertical edges to the flanges 13 and 14 on the front side of the unit. The distributor 24 may also be secured to the rear wall 20 as indicated at 25 and 26 and spaced therefrom by spacers 27 and 28 so as to form an air passage between itself and the rear wall 20. If desired the side walls 11 and 12 may be provided with handles 29 and 30 respectively. The front wall 20 and rear wall 21 are connected by a suitable number of cross-pieces 31 which serve as supporting means for the electrical unit hereinafter described. The cross-pieces 31 are preferably in the form of flat strips and are bracket-shaped. The same are positioned with the legs thereof extending downwardly and are secured to both of said walls by bolts 32. One of the cross-pieces is best shown in Fig. 4. The structure thus far described forms one of the assembled units comprising our invention, namely the housing or casing.

The other unit comprising our invention, which we have referred to as the electrical unit, is designated as a whole by the numeral 33, comprises a flat element or plate 34, the longitudinal ends 35 and 36 of which are bent downwardly at right angles to form side walls. As shown in Fig. 4, the side walls 35 and 36 are bent more or less S-shaped at their edges to form slots 37 and 38 therein respectively to accommodate a ventilating screen 39 which forms the bottom wall of the unit 33. The plate 34 is provided with a suitable number of openings 40 which correspond to the number of heating elements employed. A plurality of smaller holes 42 are provided around each of the openings 40, the surfaces around the holes 42 being slightly raised to form supports 41 for the heating element. An electric heating element 43 which preferably consists of a heating coil wound upon a grooved hollow element of refractory material is positioned concentric with each of the openings 40 and secured to the plate 34 by means of screws 44 which extend through the openings 42. The particular type of heating element does not form a part of our present invention. By this arrangement, air currents may pass through the screen 39 and through the heating elements. At one end, the unit 33 is provided with a suitable switch mechanism 53, which is circular in cross-section and adapted to fit the cut-out portion 15 of the end wall 12. A curved member 54, shown in Fig. 9, is positioned on the lower side of the unit 33 and secured to a strip 45 which supports the switch mechanism 53 as shown in Fig. 2. The member 54 is provided with an opening 55 through which the electrical conductors to the switch may extend, the same being omitted from the drawings for the sake of simplicity. The plate 34 is provided with a plurality of rectangular tongues 46, corresponding to the number of supports 31 on the casing 10 and adapted to engage the same so as to support the unit 33 thereon. At its opposite end, the unit 33 is provided with a locking or latching element 47. This element is preferably semi-circular in form, and is pivotally secured at its center 48 to a cross-piece 49 extending between the side walls 35 and 36, as shown in Fig. 10. The latch 47 is preferably provided with an arcuate slot 50, and the cut out portion is bent downwardly at right angles to form a handle 51 for rotating the latch about its center 48.

In view of the foregoing detailed description of apparatus embodying our invention, its operation will be readily understood from a brief description thereof.

The complete casing unit 10 and electrical unit 33 are separately assembled. The latch 47 is rotated so that it is entirely within the unit 33 or in its closed position. The unit 33 is then placed in the unit 10 from below and moved to the right as viewed in Fig. 2, so that the tongues 46 engage the cross-pieces 31 and support the unit 33 within the casing 10. The latch 47 is then rotated through 180° so that it rests on the inner surface of flange 13 of the end wall 11. If desired the latch 47 and the flange 13 may be provided with cooperating openings and secured together by a screw 52. It will be seen that when the unit 33 is inserted in the housing 10 as described, the electrical heating elements are positioned between the screen 21 and the distributor 24 and that the switch mechanism 53 extends out of the housing as shown in Figs. 1 and 2. By this arrangement currents of air may also circulate through the screen 21 out of the ends of the unit 33 and over the rear surface of the reflector 24. The function of the heater will readily be understood without further explanations.

We claim:

1. An electric air heater comprising a housing having support means, said housing having an opening in the lower end thereof, a plurality of heating elements provided with a common mounting, said elements being insertable through said opening, and a movable member for removably locking said mounting to said housing.

2. An electric air heater comprising a housing having support means, said housing having an opening in the lower end thereof, a plurality of heating elements provided with a common mounting, said elements being insertable through said opening, means for removably securing said mounting to said housing, and a switch secured to said mounting, said switch being accessible from one side of said housing.

3. An electric air heater comprising a housing having an opening in one wall thereof, a plurality of heating elements adapted to be normally positioned within the housing, a common mounting for said elements, a switch secured to said mounting adjacent one edge thereof, and means for removably securing said mounting to the housing whereby the heating elements, mounting and switch may be removed as a unit from the housing, said switch being accessible from one side of said housing when the heater is assembled.

4. An electric heater comprising a housing having an open bottom and transverse elements extending across said bottom, and a unit comprising electrical heating elements, control switch and connections adapted to be inserted through said open bottom and supported by said transverse elements in operative position within the housing.

5. An electric heater comprising a housing having a heat distributor, a screen in front of said distributor, an open bottom, and transverse elements extending across said bottom and a unit comprising electrical heating elements, connections and control switch, adapted to be inserted through said open bottom and supported by said transverse elements with the heating elements in front of the distributor and the switch extending out of the housing.

6. In an electric heater having a casing, a unit comprising a supporting element formed with downwardly extending parallel walls on two sides, a screen supported between said walls near their edges, a control switch secured to one end of said element, heating elements secured to the upper surface of said supporting element and transverse tongues on the upper surface of said supporting element for securing the unit within the casing.

7. An electric heater comprising a housing having an open bottom and transverse strips extending across said bottom and a unit comprising electrical heating elements and having transverse tongues on its upper surface adapted to engage said strips and support said unit within the housing.

8. An electric heater comprising a housing having closed side and rear walls and a perforated front wall, an open bottom, a heat distributor between said front and rear walls and transverse elements extending across the open bottom, and a unit comprising electrical heating elements, a control switch and connections having transverse tongues on its upper surface arranged to engage said transverse elements and support said unit within the housing with the heating elements in front of the distributor and the control switch extending out of the housing.

In testimony whereof, we have hereunto set our hands.

ARTHUR J. KERCHER.
WILLIAM WESLEY HICKS.